Aug. 30, 1949.      L. GRANGETTE      2,480,463
AUTOMATIC CONTROL OF ELECTRIC ARC FURNACES
Filed Feb. 28, 1946      3 Sheets-Sheet 1

Inventor,
Louis Grangette
By Young, Emery & Thompson
Attys.

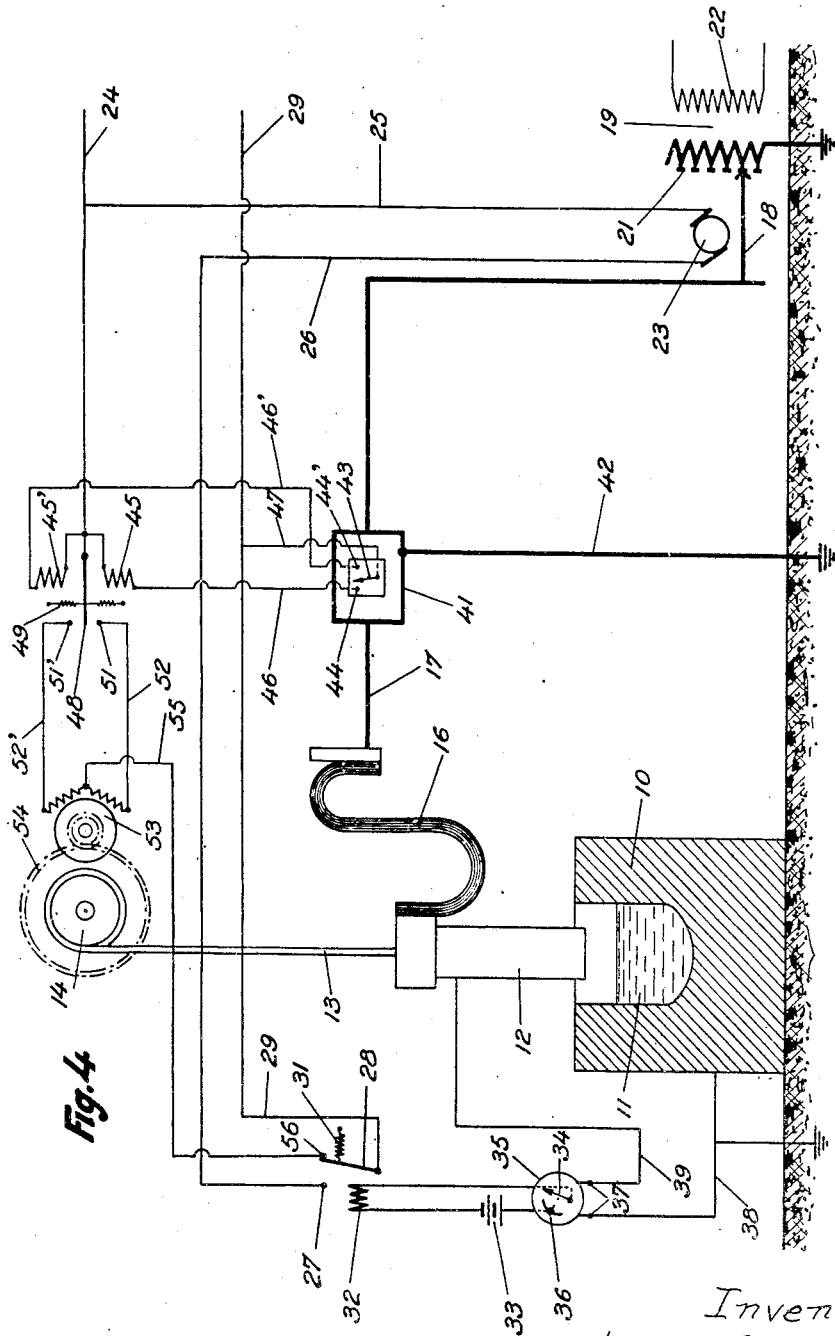

Aug. 30, 1949.  L. GRANGETTE  2,480,463
AUTOMATIC CONTROL OF ELECTRIC ARC FURNACES
Filed Feb. 28, 1946  3 Sheets-Sheet 3
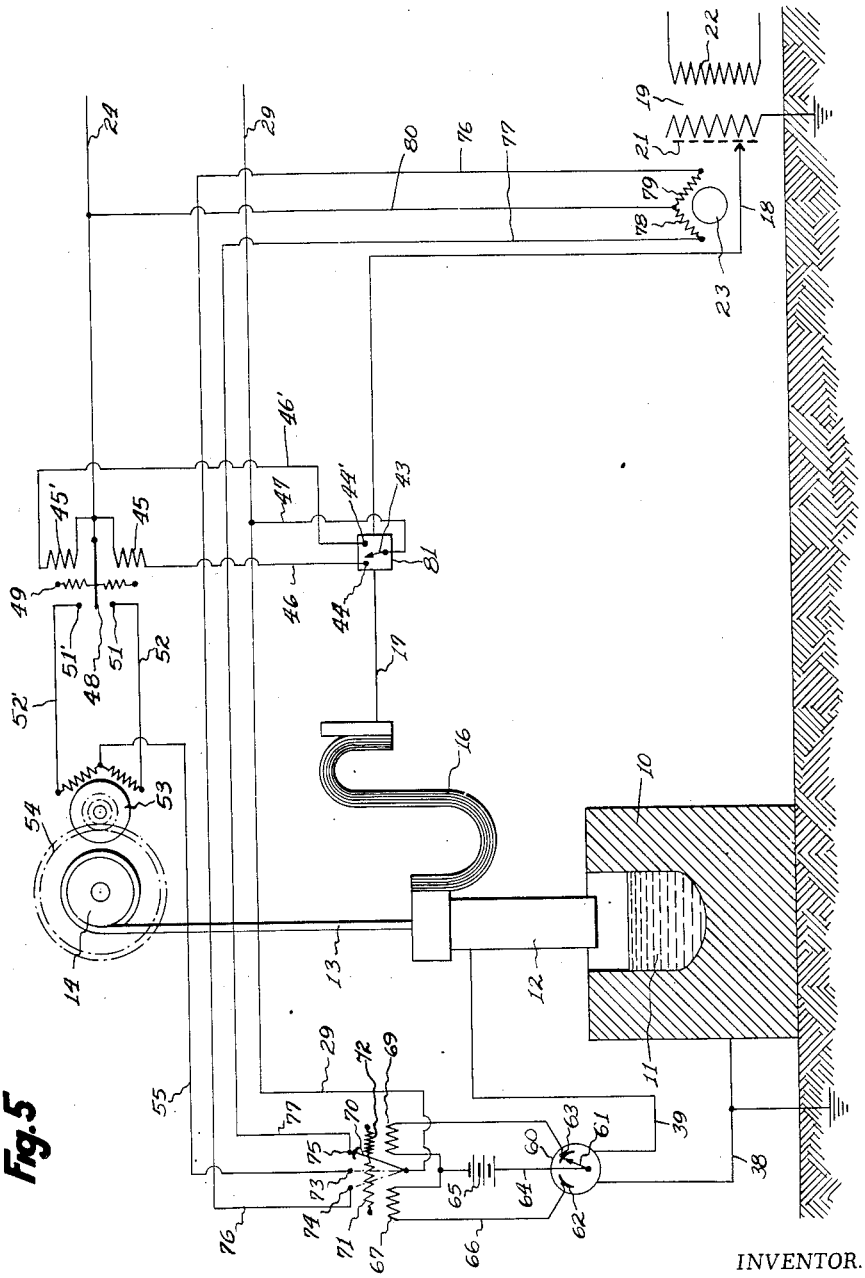
INVENTOR.
*Louis Grangette*
BY
*Young, Emery & Thompson*
Attys Patented Aug. 30, 1949

2,480,463

UNITED STATES PATENT OFFICE 2,480,463

AUTOMATIC CONTROL OF ELECTRIC ARC FURNACES

Louis Grangette, Casablanca, Morocco

Application February 28, 1946, Serial No. 650,963
In France July 18, 1939

Section 1, Public Law 690, August 8, 1946
Patent expires July 18, 1959

2 Claims. (Cl. 314—75)

During the running of an electric arc furnace and in particular of a furnace for steel, the intensity of the arc current is subjected to sudden and sometimes considerable variations, due to the wear of the electrodes, variations in the level of the bath and of the charge, and also to the agitation which is produced in the liquid bath.

These variations obviously react on the potential at the terminals of the furnace and cause disturbances in the mains which are always very troublesome and may be dangerous either for the transformers or for the alternators which produce the current. In any case, the power absorbed is modified and the specific consumption of current per ton produced is increased.

Now, it is important industrially, to avoid these disturbances and to reduce to a minimum the specific consumption. The first conditon requires that the intensity and the potential should be kept as constant as possible and the second, that the power factor or $\cos \phi$ be as near unity as possible, whilst giving to the power absorbed a value sufficient for the operation to be rapid and the external losses be reduced to a minimum.

It is possible by known devices—insulated and closed furnaces—to considerably reduce the external losses in such manner that, in the choice of the running energy, one can be guided above all by the necessity of making $\cos \phi$ close to unity, whilst ensuring a sufficiently rapid production.

It therefore appears that the best method of regulation would consist, presuming that the absorbed power best adapted to the furnace for obtaining a low specific consumption has been determined, in keeping this power absorbed constant.

Unfortunately, the regulation to constant power absorbed is not at present always possible, principally in a case of furnaces with great inductance, such as steel furnaces, at least if it is desired to regulate it simply by displacement of the electrode. This phenomenon is well known and it has been noticed that, in certain cases, when the furnace runs with the full charge, if the potential at the terminals of the mains falls below a certain value, the production of the furnace drops, in spite of any increase of the intensity allowed in the arc by the displacement of the electrode. The more amperes the furnace absorbs, the more the specific consumption of current increases, whilst at the same time the hourly production of the furnace diminishes; this is due to an excessive reduction of the $\cos \phi$.

Regulating apparatus have been used acting on the electrodes and having for their purpose either to keep the potential constant or to cause the furnace to operate with a constant length of arc, or again at constant impedance. Whilst all these apparatus ensure the desired regularity of running, they have the great drawback of sacrificing to this the specific consumption.

The device according to the present invention presents a considerable improvement and effects a very important economy because it ensures the regulation of the running of the furnace with constant power absorbed in every case.

There is thus obtained perfect regularity of running at the same time that the specific consumption is reduced to a minimum, since the device allows of fixing the value of the power absorbed as desired, that is to say obviously at the figure which will give the minimum of losses.

Referring to the drawing:

Figure 4 is a schematic representation of one form of the invention applied to a single phase furnace.

Figure 5 is a modification of the single phase furnace of Figure 4.

This device comprises, on the one hand, a minimum potential regulator constituted by a voltmetric relay acting on the supply voltage of the arc and, on the other hand, a regulator of power absorbed constituted by a wattmetric relay acting on the distance apart of the electrodes.

The voltage regulator and the power regulator may be connected in such manner that they cannot function simultaneously. Preferably, in this connection, the voltage regulator controls in a preponderant manner the circuit placing the power regulator in operation, so that the power regulation is only possible if the voltage is above a limiting value.

According to a modification of the device, the voltage regulator is both minimum and maximum and the power regulator then comprises a simple ammeter relay.

Figure 1:
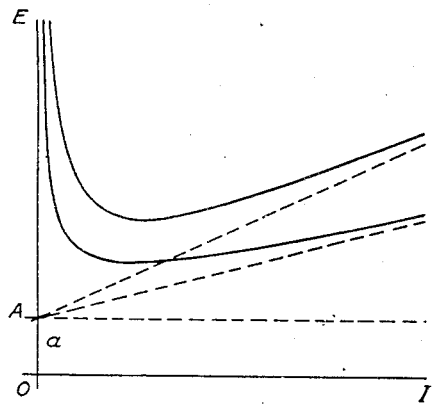
Figures 1–3 are graphs referred to in the mathematical discussion.
Figure 2:
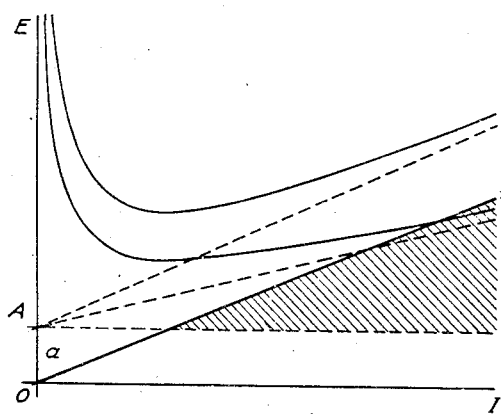
Figure 3:
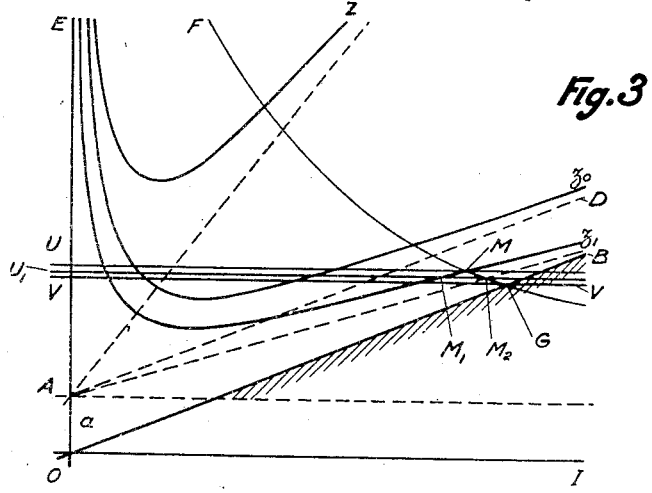

The justification for the efficiency of the device according to the invention is found in the mathematical reasoning shown hereinafter with reference to Figs. 1, 2 and 3 of the accompanying drawings.

The known formula which connects the voltage $E$ at the terminals of the arc, the current intensity $I$ traversing the latter, and the distance $z$ of the electrodes from each other is as follows:

(1) $$E = a + bzI + \frac{c + kz}{I}$$

$a, b, c, k$ being constants

This can be represented graphically (Fig. 1) by a series of hyperbolas, all located above the straight line A, the equation of which is:

$$E = a$$

These hyperbolas all admit for a common asymptote the axis OE of the ordinates and as second asymptotes concurrent straight lines of equation:

(2) $$E = a + bzI$$

passing through the point where the straight line A intersects the axis OE of the ordinates.

On the other hand, the power factor $\cos \phi$ is given by the formula:

(3) $$\cos \phi = \sqrt{1 - L^2 w^2 \frac{I^2}{E^2}}$$

in which L represents the inductance of the furnace circuit and $w$ the frequency of the current. For a value E of the voltage at the terminals of the furnace, the useful power $P = EI \cos \phi$ could be kept constant by shifting the electrodes if the quantity $I \cos \phi$ always varies in the same sense as the current intensity when the electrode is shifted.

The quantity $I \cos \phi$ may be written as $$I \cos \phi = I\sqrt{1 - L^2 w^2 \frac{I^2}{E^2}}$$

Its differential with regard to I is:

$$d(I \cos \phi) = \left[\sqrt{1 - L^2 w^2 \frac{I^2}{E^2}} - \frac{L^2 w^2 \frac{I^2}{E^2}}{\sqrt{1 - L^2 w^2 \frac{I^2}{E^2}}}\right] dI$$

(4) $$d(I \cos \phi) = \frac{1}{\sqrt{1 - L^2 w^2 \frac{I^2}{E^2}}} \left(1 - 2L^2 w^2 \frac{I^2}{E^2}\right) dI$$

But I is related to $z$ by the Equation 1 which may be written in the form:

$$(a - E)I + bzI^2 + c + kz = 0$$

By differentiating this expression there is obtained:

$$[a - E + 2bzI] dI + (bI^2 + k) dz = 0$$

there is deducted from this:

$$dI = -\frac{bI^2 + k}{a - E + 2bzI} dz$$

whence, by transferring into (4)

$$\frac{d(I \cos \phi)}{dz} = \left(2L^2 w^2 \frac{I^2}{E^2} - 1\right) \cdot \frac{1}{\sqrt{1 - L^2 w^2 \frac{I^2}{E^2}}} \cdot \frac{bI^2 + k}{a - E + 2bzI}$$

The second factor is positive. It is the same with the third if I is sufficiently great. The derivative has therefore the sign of the quantity.

$$2L^2 w^2 \frac{I^2}{E^2} - 1$$

or:

$$\left(2Lw\frac{I}{E} + 1\right)\left(2Lw\frac{I}{E} - 1\right)$$

If there be drawn on the graph representative of the Formula 1 the straight line OB of equation:

(5) $$e = i\sqrt{2Lw}$$

this straight line passes through the origin of the co-ordinates and divides the plane into two regions.

When the point representative of the state of the furnace is in the region located below the straight line OB (region etched on Figure 2) the derivative (4) is positive. If then the separation $z$ of the electrodes is diminished (which has for effect to increase I) the useful power decreases. Now, the representative point has all the greater probability of going into the said etched region, the greater the angular coefficient which the straight line OB has; that is to say, the greater the inductance of the furnace.

It is, of course, found in practice that the greater the inductance of the circuit of a furnace is, the easier there is produced the phenomena termed "sluggishness of the furnace." This consists in a slowing down of the production and an increase in the specific consumption, when it is sought to compensate for a lowering of the voltage at the terminals of the furnace by increasing the current intensity admitted in the arc by approaching the electrodes.

If, on the contrary, the point representative of the state of the furnace is in the zone located above the straight line OB represented by the Equation 5, the power increases when the electrodes are approached; that is to say, when the current intensity is increased. If the point representative of the state of the furnace can be kept in this zone, it is then always possible to make the regulation by constant power absorbed, a condition for the best output.

Examination of the graph permits of perceiving by what process it is possible to keep the point representative of the state of the furnace in the most advantageous zone, and of effecting at the same time regulation by constant power absorbed.

Let Z be the maximum lift of the furnace electrode. Let us consider the corresponding hyperbola (Figure 3) representing the the current passing in the arc and trace the straight line $$e = i\sqrt{2Lw}$$

If this straight line does not intersect the hyperbola (Z) it is evident that for every value of the voltage permitting the passage of the current in the arc for this lift Z of the electrode, the constant power regulation is possible, since all the points of the hyperbola are above the straight line. For it to be so, it is sufficient that the angular coefficient $bZ$ of the oblique asymptote of the hyperbola (Z) be greater than the angular coefficient $\sqrt{2Lw}$ of the straight line OB, that is to say that:

$$Z > \frac{2Lw}{b}$$

We then trace through A the parallel AD to the straight line $e = I\sqrt{2Lw}$. This parallel is asymptote to a hyperbola $z_0$ corresponding to a lift $z_0$ less than the maximum lift of the electrode. For any lift less than $z_0$, there exists a value of the voltage such that if the voltage at the terminals of the furnace is less than this, it is no longer possible to keep the useful power constant by simply manipulating the electrode. This value of the voltage is that which corresponds to the meeting point G of the straight line OB.

$$e = i\sqrt{2Lw}$$

and the hyperbolic curve F of equation:

$$ei \cos \phi = P$$

the constant value P being the power which has been chosen as regulating power giving the lowest specific consumption of current.

Then let $z_i$ be any position whatever of the electrode comprised between the lift $z_0$ and the contact with the base and let U be the voltage corresponding thereto at the terminals of the furnace, for this position of the electrode, at the optimum power P chosen. The state of running of the furnace is then represented by the point M of intersection common to the straight line $$e = U$$

to the hyperbola representative of the arc for the lift $z_1$ of the electrode and to the curve F:

$$ei \cos \phi = P$$

Let us suppose that in consequence of overcharge of the mains or for any other reason, the voltage of the furnaces diminishes and assumes the value $U_1$. The point representative of the state of the furnace comes to $M_1$, the point of intersection of the hyperbola $(z_1)$ and of the straight line $e = U_1$.

If it is desired to maintain the useful power at its value P, it is necessary to lower the electrode to a position such that the point representative of the state of the furnace comes to $M_2$ on the curve F. But the representative point can only come to $M_2$ if this point $M_2$ of intersection with the straight line $e = U_1$ and of the hyperbolic curve F is above the straight line OB. It is necessary for this that if G is the point of intersection of this straight line OB and the hyperbola F, the distance from the point G to the straight line $e = U$ is greater than the drop of the voltage $U - U_1$ at the terminals of the furnace. That is to say, that the voltage at the terminals of the furnace must not drop below the value V corresponding to the ordinate of the point G above defined. V is the critical value of the voltage corresponding to the regulation power P chosen, and to the inductance of the furnace circuit and there is a critical value of the voltage for each value P for a given furnace.

If it is desired to regulate by constant power, it is then indispensable, first of all, to bring the voltage at the terminals of the furnace above the critical voltage; after which it is possible by a shifting of the electrode to keep the power absorbed constant.

It is thus shown by the above demonstration that the "sluggishness" of certain electric arc furnaces and the high specific consumption resulting therefrom arise from the drop of voltage at the terminals of the furnace below a certain critical value. The same demonstration indicates that the means for remedying this fault consist in first raising the voltage at the terminals of the furnace above this critical value and then bringing the useful power to the value chosen in advance.

Two forms of construction of a device conforming to the present invention applied to a monophase furnace are schematically represented by way of example in Figures 4 and 5 of the drawings. In Figure 4, reference character 10 designates the crucible of an electric furnace constituting one of the electrodes and containing a bath 11, for example of steel to be refined. Above this trough there is a movable electrode 12 mechanically attached to a cable 13 or the like which is wound on a winch 14. The electrode constituted by the trough is naturally earthed, whilst the other electrode 12 is connected by a flexible conductor 16 and an ordinary conductor 17 to the movable brush 18 of a voltage regulator comprising a transformer 19, the secondary of which comprises a certain number of voltage contact studs 21 co-operating with the brush 18, whilst the primary 22 of the transformer is connected with the mains in the ordinary way. The movable brush 18 is controlled by an electric motor 23 supplied from an auxiliary line 24—29 by a circuit comprising a conductor 25, a conductor 26, the fixed contact stud 27 of a relay and the movable armature 28 of this relay where the conductor 29 of the auxiliary line terminates.

The armature 28 of the relay is reset by a spring 31 in a position separated from the contact plug 27, whilst the winding 32 of this relay tends, when it is excited, to place the armature 28 in contact with the plug 27. The relay in question is of the voltmetric type, that is to say, the circuit of its winding 32 comprises in addition to a suitable source 33, the movable member 34 of an apparatus 35, such as a voltmeter, in which the displacements of the movable member 34 are made dependent upon the electric potential which is applied to the terminals of this apparatus.

The field circuit of the winding 32 finally comprises a plug 36 of adjustable position with respect to the movable member 34 and capable of being contacted by this movable member when the voltage applied to the terminals 37 of the apparatus 35 is below a limit value, determined according to the position chosen for the plug 36. The terminals 37 are connected respectively by conductors 38 and 39 to the trough 10 and to the electrode 12 of the furnace.

The device also comprises a regulator of absorbed power of wattmetric relay type. This relay comprises in the first place a type of wattmeter 41 inserted on the conductor 17 and receiving by an earthed conductor 42, the influence of the voltage applied to the electrodes. Its movable member 43 co-operates with two adjustable contact plugs 44 and 44', as regards position, and which plugs are capable of being contacted by the said movable member. These contact plugs are inserted in two circuits comprising the conductor 24 of the auxiliary line, the windings 45 and 45' of a relay, conductors 46, 46' and 47, the conductor 29 of the auxiliary line, and movable member 43.

The windings of relays 45 and 45' in opposition control the same movable armature 48 connected to the conductor 24 of the auxiliary line and reset by two springs 49 which, when any of the windings 45 and 45' is not excited, keep it in a medium position, between two fixed contact plugs 51 and 51' connected by two conductors 52 and 52' to the windings of an electric motor 53 which, through the intermediation of speed-reducing gears 54 controls the rotation of the winch 14. According to whether the current circulates in the conductor 52 or 52', the motor 53 rotates in one direction or in the other. The circuit of the motor 53 is completed by a conductor 55 which terminates at a fixed contact plug 56 on which rests the movable armature 28 when it is freely acted upon by its re-setting spring 31.

The operation of the device above described is as follows:

The furnace being supposed as working, the movable member 34 of the voltmetric apparatus 35 is separated from the plug 36 since the normal operating voltage is greater than the lower limit voltage which has been fixed.

Furthermore, the movable member 43 of the wattmetric apparatus 41 is normally comprised between the plugs 44 and 44', so that none of the windings 45 and 45' of the relay are excited and the motor 53 and the electrode 12 remain fixed.

However, if the voltage between the electrodes 10 and 12 of the furnace drop below the critical value, the movable member 34 contacts the plug 36, the winding 32 is excited, the armature 28 comes into contact with the plug 27 and the motor 23 which is thus supplied, causes the displacement of the movable brush 18 towards a contact 21 of higher voltage, so that the movable member 34 of the voltmetric apparatus 35 leaves the plug 36 with the result that the motor 23 stops and this situation is maintained.

It is to be noted that during the operation of the voltage regulator, the movable armature 28 leaves the plug 56 so that the supply circuit of the motor 53 is definitely open.

The regulation of the voltage being assured as has just been stated, the spring 31 brings the armature 28 into contact with the plug 56. If the wattmetric apparatus 41 indicates that the power absorbed passes below or above the proper value, the movable member 43 contacts a plug 44 or 44′ which excites the winding 45 or 45′ corresponding thereto and closes the appropriate circuit of the motor 53; the latter starts to rotate in the necessary direction and causes the raising or lowering of the electrode 12 until, the power absorbed having returned to its normal value, the movable member 43 cuts off the excitation of the winding 45 or 45′ and causes the stoppage of the motor 53.

A modified form of device according to the present invention is shown in Figure 5. Most of the elements of this figure have already been illustrated in Figure 4 and like parts are indicated by like reference characters. In this form of construction, the conductors 38 and 39 extending respectively from the crucible 10 and the electrode 12 are connected to terminals of voltmeter 60 or similar device sensitive to the potential and the movable element or pointer 61 of which travels over two sectors 62 and 63 adjustable in position and disposed in the region of the scale of the voltmeter corresponding to the normal operating voltage of the furnace.

The pointer 61 is formed of conductive material and is connected by a conductor 64 to one of the poles of a source of current 65. The sector 62 is connected by a conductor 66 to a winding of a relay 67 connected on the other hand to the other pole of the source of current 65. Likewise, the sector 63 is connected by conductor 68 to a second winding of relay 69 similarly connected to the source 65.

The two windings of the relay 67 and 69 are positioned in opposition and act in opposite directions on a movable armature 70 which by means of two opposed springs 71 and 72 has a tendency to be maintained in a mean position equally distant from the two windings 67 and 69.

This movable armature which is connected permanently to a conductor 29 of the auxiliary line cooperates with three contact points 73, 74 and 75. Contact point 73 which is between the other two is that on which the armature 70 rests when neither of the windings 67 and 69 are excited. Contact point 73 is connected by the conductor 55 to the circuit of the motor 53 which moves the electrode 12.

Contact point 74 is engaged by the movable armature 70 when the winding 67 is excited. Similarly, when the winding 69 is excited, the armature 70 comes in contact with the contact point 75. Contact points 74 and 75 are respectively connected by conductors 76 and 77 to the inductor winding 78 and 79 of the motor 23 which actuates the movable arm 18 of the voltage regulator. These windings are on the other hand connected by a common conductor 80 to the wire 24 of the auxiliary line. Depending upon whether the current circulates through the conductor 76 or 77, the motor 23 will turn in one direction or the other.

The relay which controls the motor 53 actuating the electrode 12 does not have to be a wattmetric relay, that is to say, sensitive to the power absorbed by the furnace. It is sufficient that this relay be sensitive to the intensity of the current absorbed by the furnace. In this respect, a simple ammeter 81 is interposed in the conductor 17 which feeds the furnace, but there is in this ammeter a movable element 43 which cooperates with the points 44 and 44′ connected by conductors 46 and 46′ to windings 45 and 45′ already described in connection with Figure 4. Similarly, this movable element 43 is permanently connected by a conductor 47 to the wire 29 of the auxiliary line.

The operation of this second form of apparatus is as follows: The furnace being in normal operation, the movable element 61 of the voltmetric apparatus 60 is positioned between the sectors 62 and 63 so that neither of the windings 67 or 69 is excited. The armature 70 is in contact with the point 73 and consequently the ammeter apparatus 81 can regulate the position of the electrode 12 according to the intensity of the current which is below or above the normal current.

If the potential between the electrodes 10 and 12 of the furnace falls below the critical value, the movable element 61 will engage the contact 62, the winding 67 will be excited and the armature 70 will come in contact with the point 74 which will excite the winding 78 of the motor 23 which turns and effects the displacement of the arm 18 toward a point 21 of high voltage. If the voltage increases and the movable element 61 of the voltmetric apparatus leaves the point 62, the motor 23 will be stopped and will maintain this position.

Since during the operation the armature 70 has left the point 73, the circuit of the motor 53 is broken and no displacement of the electrode 12 can take place.

If, by reason of irregularity in the electric supply network, the voltage becomes too strong, the movable element 61 of the voltmetric apparatus will engage the point 63 bringing the armature 70 in engagement with contact 75. The motor 23 will then rotate in an opposite direction to reduce the voltage applied to the furnace to its normal value. Here, also during the operation, the circuit of the motor 53 is broken and the electrode 12 remains positively fixed.

I claim:

1. An apparatus for regulating the specific consumption of energy per ton of an electric arc furnace having spaced electrodes and conductors connecting the electrodes to a source of electrical energy comprising in combination means for varying the spacing between the electrodes, means sensitive to the power absorbed for controlling the electrode spacing varying means, means for varying the potential of the source of energy, and means responsive to the potential existing between the electrodes for actuating the potential varying means.

2. An apparatus for regulating the specific consumption of energy per ton of an electric arc furnace having spaced electrodes and conductors connecting the electrodes to a source of electrical energy comprising in combination, means for varying the spacing between the electrodes, means responsive to the power absorbed for actuating said electrode spacing varying means, a regulator for the voltage of the source of energy, and means sensitive to the potential existing between the electrodes for actuating the voltage regulator, said means being arranged for avoiding the operation of the means for varying the spacing of the electrodes during the operation of the potential regulator.

LOUIS GRANGETTE.

REFERENCES CITED

The following references are of record in the file of this patent:

UNITED STATES PATENTS

| Number | Name | Date |
|---|---|---|
| 947,849 | Reid | Feb. 1, 1910 |
| 1,189,794 | Creveling | July 4, 1916 |
| 1,253,198 | Montgomery et al. | Jan. 8, 1918 |
| 1,320,071 | Lehr | Oct. 28, 1919 |
| 1,347,838 | Bulley | July 27, 1920 |
| 1,479,836 | Saklatawalla et al. | Jan. 8, 1924 |
| 1,495,421 | Marshick | May 27, 1924 |
| 1,571,924 | Kenyon | Feb. 2, 1946 |
| 2,419,988 | Davis | May 6, 1947 |

FOREIGN PATENTS

| Number | Country | Date |
|---|---|---|
| 179,595 | Great Britain | May 21, 1922 |
| 857,940 | France | Apr. 29, 1940 |